(12) United States Patent
Chen et al.

(10) Patent No.: US 10,471,843 B2
(45) Date of Patent: Nov. 12, 2019

(54) VEHICLE BATTERY DEVICE

(71) Applicant: NATIONAL CHUNG SHAN INSTITUTE OF SCIENCE AND TECHNOLOGY, Taoyuan (TW)

(72) Inventors: Jing-Hong Chen, Taoyuan (TW); Wei-Yuan Liao, Taoyuan (TW); Yu-Hung Chen, Taoyuan (TW); Ching-Hsiang Wang, Taoyuan (TW); Chia-Chen Wu, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 188 days.

(21) Appl. No.: 15/841,642

(22) Filed: Dec. 14, 2017

(65) Prior Publication Data

US 2019/0184920 A1  Jun. 20, 2019

(51) Int. Cl.
| | |
|---|---|
| *B60L 50/64* | (2019.01) |
| *B60R 16/033* | (2006.01) |
| *H01M 2/08* | (2006.01) |
| *H01M 2/10* | (2006.01) |
| *B60K 1/04* | (2019.01) |
| *B60R 16/04* | (2006.01) |

(52) U.S. Cl.
CPC .............. *B60L 50/64* (2019.02); *B60K 1/04* (2013.01); *B60R 16/033* (2013.01); *B60R 16/04* (2013.01); *H01M 2/08* (2013.01); *H01M 2/1072* (2013.01); *H01M 2/1083* (2013.01); *H01M 2220/20* (2013.01)

(58) Field of Classification Search
CPC .... H01M 2/1072; H01M 2/1083; B60K 1/04; B60L 50/64
USPC .......................................................... 429/96
See application file for complete search history.

(56) References Cited

U.S. PATENT DOCUMENTS

| | | | |
|---|---|---|---|
| 2013/0244075 A1* | 9/2013 | Lentine, Jr. ......... | H01M 2/1077 429/99 |
| 2014/0045024 A1* | 2/2014 | Waters ................ | H01M 2/1061 429/99 |
| 2017/0117519 A1* | 4/2017 | Schoenherr ......... | H01M 2/1072 |

\* cited by examiner

*Primary Examiner* — Basia A Ridley
*Assistant Examiner* — James M Erwin
(74) *Attorney, Agent, or Firm* — Schmeiser, Olsen & Watts, LLP

(57) ABSTRACT

A vehicle battery device comprises a box for receiving therein at least a vehicle battery, wherein a fastening platform is disposed on an inner sidewall surface of the box, and support boards is disposed at a bottom of the fastening platform; an upper lid disposed above the box and separated from the box by a waterproof plastic sheet; and at least a quick-release unit comprising a screw, washer, spring, fixing board, and wedge-shaped fixing block, with the at least a quick-release unit fastened between the fastening platform and the vehicle battery, wherein a wedge-shaped recess is disposed on an upper surface of the vehicle battery, and a wedge-shaped fastening hole is disposed in the fixing board, allowing the wedge-shaped fixing block to penetrate the wedge-shaped fastening hole and engage with the wedge-shaped recess, thereby allowing the vehicle battery to be fixed in place inside the box.

10 Claims, 3 Drawing Sheets

VEHICLE BATTERY DEVICE

FIELD OF THE INVENTION

The present invention relates to electric vehicle technology to and, more particularly, to a vehicle battery device applicable to electric buses.

BACKGROUND OF THE INVENTION

With environmental awareness on the rise, electric vehicles are all the rage right now from the perspective of the transportation industry and automobile manufacturing industry. For instance, Volvo announced that it would no longer manufacture diesel engines and diesel engine-driven vehicles after 2020. Likewise, the British parliament passed a law to halt production of diesel and petrol vehicles by 2040 and increase uptake of electric vehicles. Hence, it is a common trend worldwide to replace gas-powered vehicles with electric vehicles gradually. The Taiwanese government encourages replacement of diesel engine-driven buses by Taiwan-made electric buses, though its ongoing achievements unveil drawbacks of conventional electric vehicles, namely the time-consuming, laborious, equipment-intensive changing of battery modules of conventional electric buses, compared with the refueling of diesel engine-driven buses. For this reason, bus companies in Taiwan nowadays are reluctant to switch to electric buses.

Conventional power packs for powering electronic products usually include a battery cell enclosed in a casing which provides physical protection, if any, to the battery cell. Power supplied by conventional power packs depends on how much electrical energy is stored in the battery cell, leading to short power supply duration of conventional power packs. Voltages of electronic products are seldom higher than 24V; hence, applications of conventional power packs are restricted to 3C products as well as charging and discharging emergency light-current systems for use with automotive alternators. Voltages higher than 48V are common only among power packs of a few green mobile power storage systems and electric buses, and the power packs are usually mounted on stationary storage racks or distributed uniformly in the vehicle, not only providing limited protection to battery modules or power packs, but also posing a risk of electric shock by generating an instantaneous or transient high voltage of 600-700V as soon as the electric buses start to be electrically driven. Furthermore, if the battery modules lack a quick-removal maintenance mechanism but get damaged, the power packs must be entirely removed in order to carry out maintenance, which is time-consuming and laborious. Moreover, the power packs have a high chance of failure when not waterproof and dustproof.

Most issued invention and utility model patents which claim a power pack are directed to a rechargeable lithium battery power pack or a mobile rechargeable lithium iron battery power pack for use with 3C products, such as computers, in a manner that the rechargeable lithium battery power pack or the mobile rechargeable lithium iron power pack is mounted on a stationary battery rack when it comes to mobile power storage systems or electric buses. The main drawback of the aforesaid stationary design is that it is time-consuming and laborious to change a power pack which has run out of power or failed. By contrast, bus companies always want their buses to undergo maintenance as rare as possible and as quickly as possible. In addition, the stationary storage racks disadvantageously have a low IP rating in terms of dustproof and waterproof protection for the power packs. On the other hand, whatever measures taken to render the stationary storage racks entirely dustproof and waterproof would be pricey, not to mention that every instance of mounting and demounting a power pack would inevitably reduce the dustproofing and waterproofing capability of the stationary storage racks to the detriment of long-term maintenance cost control.

Power packs mounted on conventional electric vehicles are fixed thereto to prevent the displacement and sliding of the power packs in x-direction and y-direction. However, power packs mounted on conventional electric vehicles running on bumpy roads are likely to jerk or vibrate in z-direction and thus get damaged. Conventional measures taken in attempt to prevent the z-direction damage involve fixing a power pack in place by fastening a bolted cover to the power pack from above or by fixing the power pack to the stationary storage rack with bolts and screws. However, the aforesaid conventional measures require mounting and demounting a lot of bolts and a cover, thereby rendering the operation process lengthy and adding to the weight of the power packs and stationary storage racks.

SUMMARY OF THE INVENTION

In view of the aforesaid drawbacks of the prior art, it is an objective of the present invention to provide a vehicle battery device for holding a power pack of an electric bus. The vehicle battery device is not only modularized so as to be quickly mounted on and demounted from the electric bus but also provided with a quick-release fastening mechanism for suppressing Z-direction (i.e., vertical) vibration of the electric bus running on bumpy roads to ensure that the battery power will not loosen as well as ensure quick mount/demounting and easy maintenance.

The present invention provides a vehicle battery device, comprising: a box for receiving therein at least a vehicle battery, wherein a fastening platform is disposed on an inner sidewall surface of the box, and a plurality of support boards is disposed at a bottom of the fastening platform; an upper lid disposed above the box and separated from the box by a waterproof plastic sheet; and at least a quick-release unit comprising a screw, a washer, a spring, a fixing board and a wedge-shaped fixing block, with the at least a quick-release unit fastened between the fastening platform and the vehicle battery, wherein a wedge-shaped recess is disposed on an upper surface of the vehicle battery, and a wedge-shaped fastening hole is disposed in the fixing board, allowing the wedge-shaped fixing block to penetrate the wedge-shaped fastening hole and engage with the wedge-shaped recess, thereby allowing the vehicle battery to be fixed in place inside the box.

In an embodiment of the present invention, support boards at the bottom of the fastening platform each have a weight-losing.

In an embodiment of the present invention, a reinforced bottom base is disposed below the bottom of the box. The reinforced bottom base is a grate which consists of main bars and transverse bars. The reinforced bottom base reinforces the box without adding to the thickness of the bottom board of the box. The reinforced bottom base is manufactured in a single-piece manner and then welded to the bottom of the box. Alternatively, the reinforced bottom base and the box are integrally formed, albeit at the cost of process simplicity and cost efficiency. In practice, the reinforced bottom base and the box are separately manufactured and then welded together in order to be cost-efficient.

In an embodiment of the present invention, the quick-release unit comprises a screw, a washer, a spring, a fixing board and a wedge-shaped fixing block. A wedge-shaped fastening hole is penetratingly disposed in the fixing board. The wedge-shaped fixing block, the wedge-shaped fastening hole, and a wedge-shaped recess disposed on the upper surface of the vehicle battery operate in conjunction with each other such that the quick-release unit is fastened to the vehicle battery, and then the fixing board is fastened to the fastening platform, allowing the quick-release unit, fastening platform and vehicle battery to be coupled together and fixed in place, thereby suppressing Z-direction jerks (which might lead to disconnection) of the vehicle running on bumpy roads.

In an embodiment of the present invention, at least a hanging-fixing element is disposed on the outer wall of the box to hang the vehicle battery device onto the electric bus and facilitate demounting a vehicle battery from the electric bus for a repair thereof and changing the battery. The hanging-fixing element is a ring bolt screwed to the outer wall of the box or an equivalent of the ring bolt. In a variant embodiment, a short hole is disposed on the outer wall surface of the box, without reducing the mechanical strength of the box, to hang the vehicle battery device onto the electric bus.

The above summary, the detailed description below, and the accompanying drawings further explain the technical means and measures taken to achieve predetermined objectives of the present invention and the effects thereof. The other objectives and advantages of the present invention are explained below and illustrated with the accompanying drawings.

DETAILED DESCRIPTION OF THE PREFERRED EMBODIMENTS

Implementation of the present invention is hereunder illustrated by a specific embodiment. Persons skilled in the art can easily understand other advantages and effects of the present invention by referring to the disclosure contained in the specification.

Figure 1:
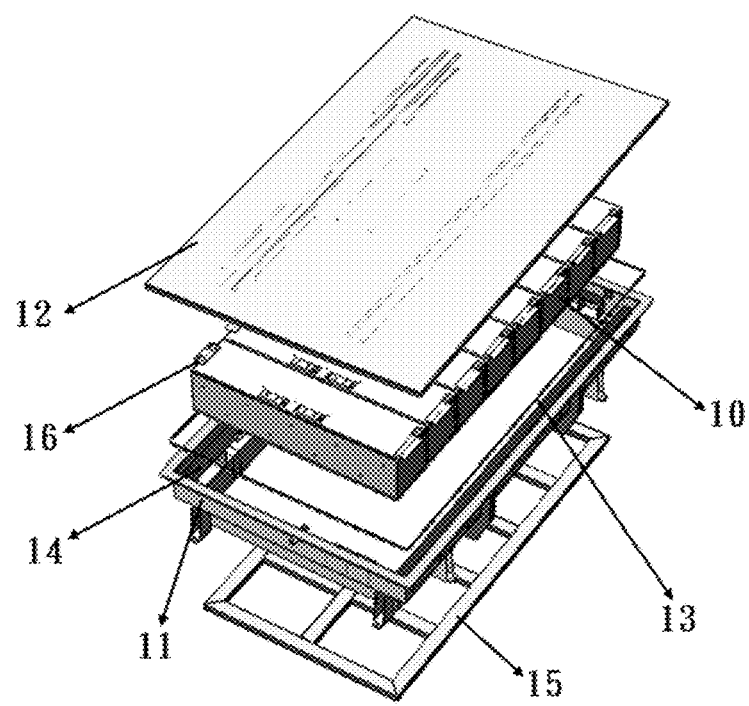
FIG. 1 is a schematic view of a vehicle battery device according to an embodiment of the present invention.

Referring to FIG. 1, there is shown a schematic view of a vehicle battery device according to an embodiment of the present invention. As shown in the diagram, the vehicle battery device comprises a box 11 for receiving a vehicle battery 10 and an upper lid 12. A waterproof plastic sheet 13 is disposed between the box 11 and the upper lid 12. A fastening platform 14 is disposed on an inner sidewall surface of the box 11. A reinforced bottom base 15 and at least a quick-release unit 16 are disposed at the bottom of the box 11. Owing to the quick-release unit 16, the vehicle battery 10 and the fastening platform 14 are coupled together and fixed in place such that the vehicle battery 10 is unlikely to jerk in Z-direction to therefore cause damage to itself or the electric bus even when the electric bus is running on bumpy roads. In practice, the fastening platform 14 facilitates welding a panel to the inner wall surface of the box 11, and a plurality of support boards (not shown) is disposed below the fastening platform 14 to reinforce the fastening platform 14. Alternately, the fastening platform 14, the support boards and the box 11 are integrally formed, albeit at the cost of process simplicity and cost efficiency. Dimensions of the fastening platform depend on the size of the vehicle battery.

Figure 2:
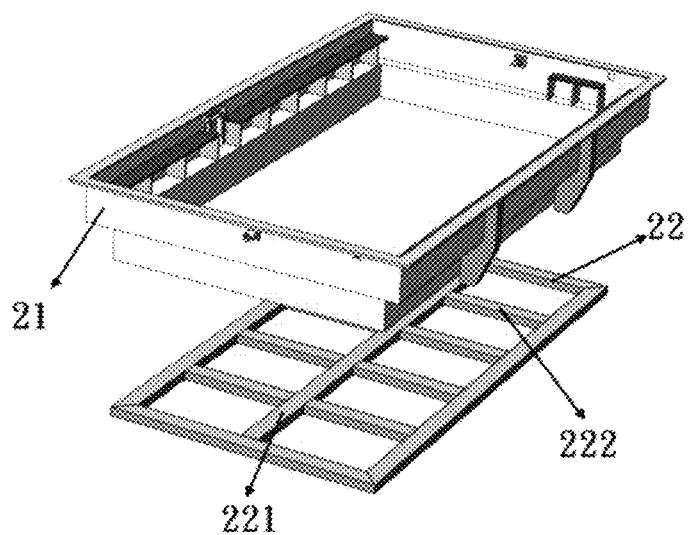
FIG. 2 is a schematic view of the vehicle battery device with a reinforced bottom base according to an embodiment of the present invention.

FIG. 2 is a schematic view of the vehicle battery device with a reinforced bottom base according to an embodiment of the present invention. As shown in the diagram, a reinforced bottom base 22 is disposed at the bottom of a box 21 of the vehicle battery device. The reinforced bottom base is a grate which consists of main bars 221 and transverse bars 222. With a vehicle battery being bulky and heavy, the box 21 must be tough enough in order to hold the vehicle battery. However, the box 21 must not be heavy, otherwise the vehicle will be heavy and poor in performance. The reinforced bottom base 22 reinforces the box 21 without adding to the thickness of the bottom board of the box 21. The reinforced bottom base is manufactured in a single-piece manner and then welded to the bottom of a box 21. Alternatively, the reinforced bottom base and the box 21 are integrally formed, albeit at the cost of process simplicity and cost efficiency. In practice, the reinforced bottom base and the box 21 are separately manufactured and then welded together in order to be cost-efficient.

Figure 3:
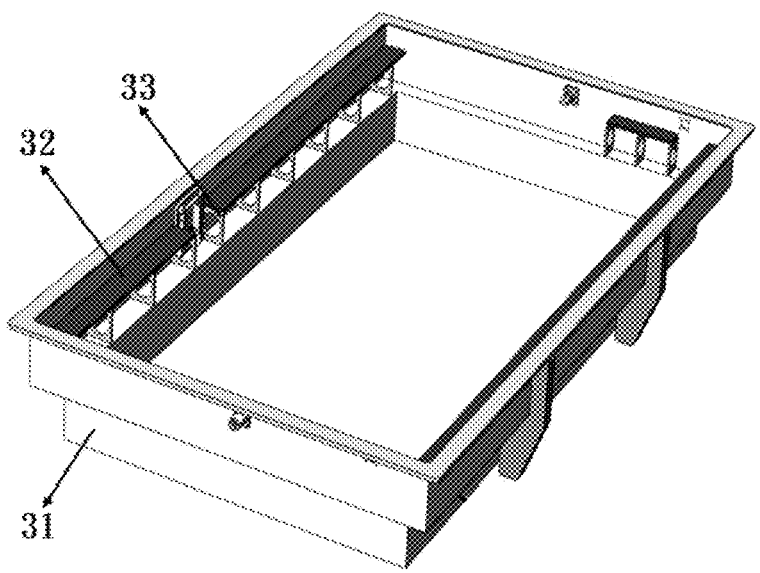
FIG. 3 is a schematic view of a fastening platform according to an embodiment of the present invention.

FIG. 3 is a schematic view of a fastening platform according to an embodiment of the present invention. As shown in the diagram, a fastening platform 32 is disposed on the inner surface of one of the sidewalls of a box 31 and comprises one or more slender panels. A plurality of support boards 33 is disposed below the fastening platform 32. The support boards 33 are each a thin board with a hollow-cored round hole. In practice, the support boards 33 and the slender panels of the fastening platform 32 are coupled together and fixed to the box 31 to not only fix the battery to the box but also reinforce the box. The box is manufactured by additive manufacturing technologies and the like, which involves a process whereby the fastening platform and support boards are integrally formed. However, at present, forming the fastening platform and support boards integrally incurs higher costs and poses more difficulties than making the fastening platform and support boards separately and then coupling together the fastening platform and support boards thus made.

Figure 4:
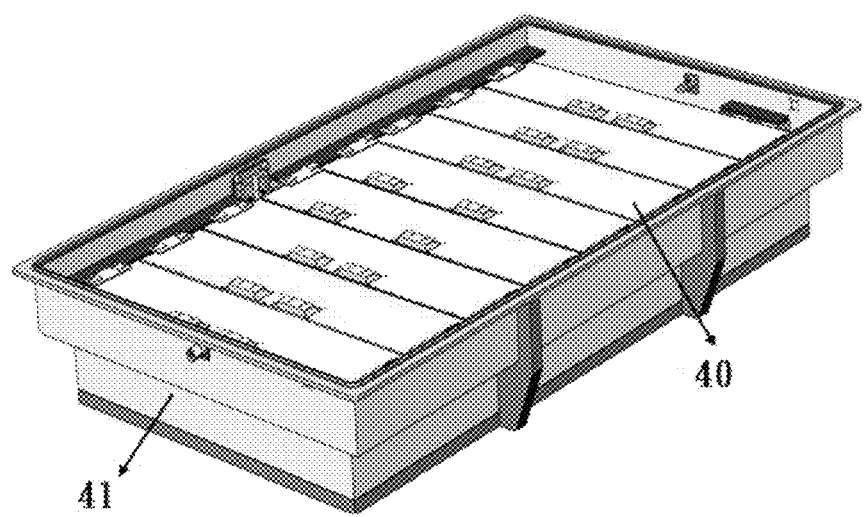
FIG. 4 is a schematic view of how to operate the vehicle battery device according to an embodiment of the present invention.

FIG. 4 is a schematic view of how to operate the vehicle battery device according to an embodiment of the present invention. A vehicle battery is too bulky and heavy to move by hand. Dimensions of a receiving space in a box 41 depend on the size of a battery 40. There is little room between the sidewalls of the box 41 and the battery 40 therein, so as to prevent the battery 40 from sliding and colliding with the sidewalls of the box 41. In electric bus maintenance factories and battery maintenance factories, the vehicle battery is nowadays moved and placed in the box 41, using a pneumatic vacuum suction machine. However, despite the tiny room disposed between the box and battery (and intended to minimize the chance of movement of the battery in X-direction and Y-direction), it is still possible for the battery in the box to jerk vertically (i.e., in Z-direction) and thereby hit the sidewalls of the box or produce noise while the electric bus is running on bumpy roads. To prevent this from happening, the prior art entails fixing the battery and box together with fixing components, such as bolts and screws. However, the more the fixing components are in use, the lengthier is the process for mounting and demounting the battery, thereby adding to the manpower, time and costs spent on battery maintenance. To solve the aforesaid problem, that is, a lengthy process of mounting and demounting a battery, the present invention provides a quick-release battery fixing structure.

Figure 5:
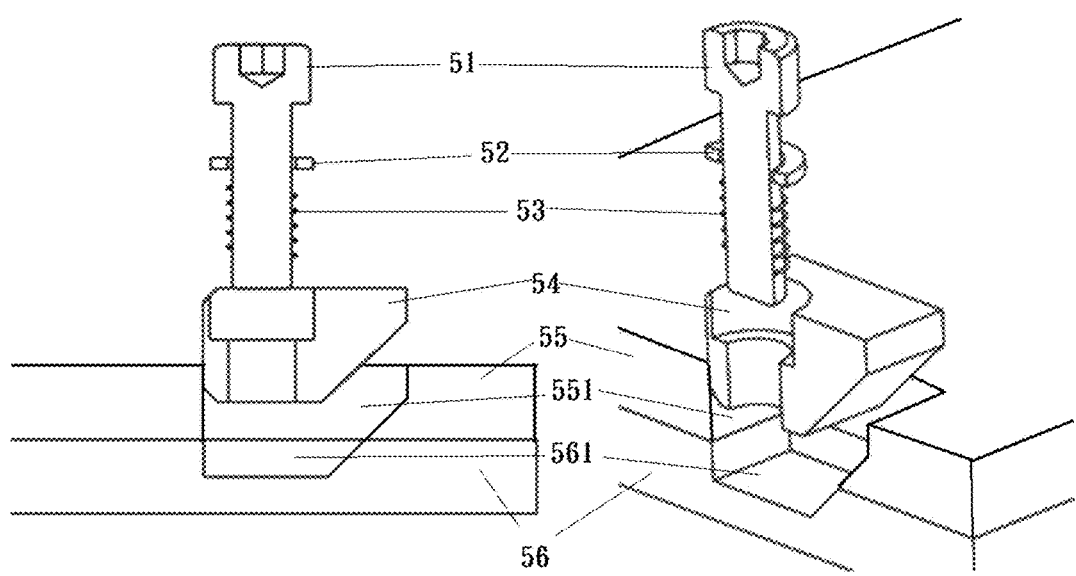
FIG. 5 is a schematic view of a quick-release unit according to an embodiment of the present invention.

FIG. 5 is a schematic view of a quick-release unit according to an embodiment of the present invention. As shown in the diagram, the quick-release unit comprises a screw 51, a washer 52, a spring 53, a wedge-shaped fixing block 54 and a fixing board 55. The upper bottom surface of the wedge-shaped fixing block has a larger area than the lower bottom surface of the wedge-shaped fixing block. The wedge-shaped fixing block is hollowed out from above and threaded internally (not shown) to mesh with the screw 51. A wedge-shaped fastening hole 551 is penetratingly disposed in the fixing board 55. A wedge-shaped recess 561 is disposed on the upper surface of a vehicle battery 56. Contours of internal space (including holes, cavities and the like) formed after the wedge-shaped fastening hole 551 and the wedge-shaped recess 561 have been coupled together match the contours of the wedge-shaped fixing block 54. Fastening the quick-release unit to the battery entails filling with the wedge-shaped fixing block 54 the internal space formed as a result of coupling the wedge-shaped fastening hole 551 and the wedge-shaped recess 561 together and then driving the screw 51 into the wedge-shaped fixing block 54. After the quick-release unit has been fastened to the battery, the other end of the fixing board is fastened to the fastening platform such that the battery is fixed to the box of the vehicle battery device of the present invention. The quick-release unit prevents the battery from jerking in Z-direction while the vehicle is running on bumpy roads. The wedge-shaped recess 561 is disposed on the upper surface of the vehicle battery and positioned proximate to one end of the fastening platform. Optionally, a fastening plate with a wedge-shaped recess is disposed on the upper surface of the battery. Hence, the technical spirit embodied in the present invention will be upheld, provided that a wedge-shaped recess serving a fixing purpose is disposed on the upper surface of the battery as needed.

The present invention further provides a wedge-shaped fixing block. Compared with conventional cylindrical blocks (the screw per se) and rectangular blocks (external pad), the wedge-shaped fixing block of the present invention is not only firmly fixed in place when inserted and withstands a larger torque than the conventional cylindrical blocks and rectangular blocks, but also remains unabated in terms of its fastening capacity when worn off slightly. Hence, the wedge-shaped fixing block is fit for use with heavy vehicle batteries. The prior art entails fastening a battery by advancing screws into the box laterally or from below. By contrast, the quick-release unit of the present invention is easy and quick to mount and demount, because all the required nuts are tightened and loosened in the same direction. Furthermore, after the vehicle battery device is lifted away from the bus, the quick-release unit can be quickly demounted (in principle, a battery is fastened in place, using a quick-release unit) so that the battery can be removed from the battery box by vacuum suction. Similarly, the process of mounting the battery in place follows the aforesaid steps reversely.

In conclusion, the present invention provides a vehicle battery device modularized to enable a battery to be quickly mounted on and demounted from a vehicle (to facilitate maintenance) and prevent the battery from jerking (and thus detaching) in Z-direction while the vehicle is running on bumpy roads. The vehicle battery device of the present invention features a wedge-shaped fixing block, a wedge-shaped fastening hole and a wedge-shaped recess which operate in conjunction with each other to fix the battery to the battery box firmly as well as enable the battery to withstand a torque better and be durable. The vehicle battery device of the present invention is applicable flexibly to electric buses, ships, aircraft, green energy storage devices, large machines, and 3C products.

The above embodiments are illustrative of the features and effects of the present invention rather than restrictive of the scope of the substantial technical disclosure of the present invention. Persons skilled in the art may modify and alter the above embodiments without departing from the spirit and scope of the present invention. Therefore, the scope of the protection of rights of the present invention should be defined by the appended claims.

What is claimed is:
1. A vehicle battery device, comprising:
 a box for receiving therein at least a vehicle battery, wherein a fastening platform is disposed on an inner sidewall surface of the box, and a plurality of support boards is disposed at a bottom of the fastening platform;
 an upper lid disposed above the box and separated from the box by a waterproof plastic sheet; and
 at least a quick-release unit comprising a screw, a washer, a spring, a fixing board and a wedge-shaped fixing block, with the at least a quick-release unit fastened between the fastening platform and the vehicle battery,
 wherein a wedge-shaped recess is disposed on an upper surface of the vehicle battery, and a wedge-shaped fastening hole is disposed in the fixing board, allowing the wedge-shaped fixing block to penetrate the wedge-shaped fastening hole and engage with the wedge-shaped recess, thereby allowing the vehicle battery to be fixed in place inside the box.

2. The vehicle battery device of claim 1, wherein the support boards each have a weight-losing opening.

3. The vehicle battery device of claim 1, wherein a reinforced bottom base is disposed below a bottom of the box.

4. The vehicle battery device of claim 3, wherein the reinforced bottom base consists of main bars and transverse bars.

5. The vehicle battery device of claim 3, wherein the reinforced bottom base is welded to the bottom of the box.

6. The vehicle battery device of claim 3, wherein the reinforced bottom base and the box are integrally formed.

7. The vehicle battery device of claim 1, wherein an end of the fixing board is fastened to the fastening platform.

8. The vehicle battery device of claim 1, wherein an upper bottom surface of the wedge-shaped fixing block has a larger area than a lower bottom surface of the wedge-shaped fixing block.

9. The vehicle battery device of claim 1, wherein a hanging-fixing element is disposed on an outer wall surface of the box.

10. The vehicle battery device of claim 9, wherein the hanging-fixing element is a ring bolt.

* * * * *